(12) United States Patent  (10) Patent No.: US 7,814,337 B2
Lee et al.  (45) Date of Patent: Oct. 12, 2010

(54) SECURE FLASH-MEMORY CARD READER WITH HOST-ENCRYPTED DATA ON A FLASH-CONTROLLER-MASTERED BUS PARALLEL TO A LOCAL CPU BUS CARRYING ENCRYPTED HASHED PASSWORD AND USER ID

(75) Inventors: Charles C. Lee, Cupertino, CA (US); I-Kang Yu, Palo Alto, CA (US); Edward W. Lee, Mountain View, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 939 days.

(21) Appl. No.: 11/623,863

(22) Filed: Jan. 17, 2007

(65) Prior Publication Data
US 2007/0198856 A1 Aug. 23, 2007

Related U.S. Application Data

(63) Continuation-in-part of application No. 10/956,826, filed on Oct. 1, 2004, now Pat. No. 7,299,316, which is a continuation-in-part of application No. 10/789,333, filed on Feb. 26, 2004, now Pat. No. 7,318,117, and a continuation-in-part of application No. 09/478,720, filed on Jan. 6, 2000, now Pat. No. 7,257,714.

(51) Int. Cl.
*H04L 9/00* (2006.01)
(52) U.S. Cl. ........................ 713/193; 713/162; 713/190; 726/21
(58) Field of Classification Search .................. 713/162, 713/166, 172, 190, 193; 726/4, 21; 707/2, 707/9
See application file for complete search history.

(56) References Cited

U.S. PATENT DOCUMENTS

| | | | |
|---|---|---|---|
| 4,797,928 A | 1/1989 | Dykes | |
| 5,854,891 A | 12/1998 | Postlewaite et al. | |
| 6,363,463 B1 * | 3/2002 | Mattison | 711/164 |
| 6,483,638 B1 | 11/2002 | Shafer et al. | |
| 6,510,521 B1 * | 1/2003 | Albrecht et al. | 713/193 |
| 6,560,709 B1 | 5/2003 | Galovich | |
| 6,615,264 B1 | 9/2003 | Stoltz et al. | |
| 6,722,573 B2 | 4/2004 | Haddad et al. | |
| 6,736,313 B1 | 5/2004 | Dickson | |
| 6,874,044 B1 | 3/2005 | Chou | |
| 7,069,447 B1 * | 6/2006 | Corder | 713/189 |
| 7,104,383 B1 * | 9/2006 | Saltsov et al. | 194/206 |
| 7,320,071 B1 * | 1/2008 | Friedman et al. | 713/165 |
| 2003/0053629 A1 * | 3/2003 | Knapen | 380/277 |

(Continued)

*Primary Examiner*—Beemnet W Dada
(74) *Attorney, Agent, or Firm*—gPatent LLC; Stuart T. Auvinen

(57) ABSTRACT

A secure flash-card reader reads a user ID from a secure card and finds a matching entry with a hashed password in a user table on the reader. An encrypted key is received from a secure host that hashes and encrypts a password the user types into the host and the user's ID. A card decryption engine uses a random number to decrypt the encrypted key and recover the hashed password and user ID from the secure host, which is compared by a comparator to the hashed password and user ID from the user table. A mismatch causes an access controller to block access to encrypted data on the secure card. Flash data is transferred over a flash-serial buffer bus between flash-card controllers and a RAM buffer. An encryption engine on the flash-serial buffer bus encrypts and decrypts data and connects to a serial engine to the host.

20 Claims, 13 Drawing Sheets

U.S. PATENT DOCUMENTS

| | | |
|---|---|---|
| 2003/0167395 A1 | 9/2003 | Chang et al. |
| 2004/0059916 A1* | 3/2004 | Mizushima et al. ......... 713/172 |
| 2004/0059925 A1 | 3/2004 | Benhammou et al. |
| 2004/0135241 A1 | 7/2004 | Conner et al. |
| 2004/0236693 A1 | 11/2004 | Quesselaire |
| 2005/0185067 A1 | 8/2005 | Estakhri et al. |
| 2006/0095771 A1 | 5/2006 | Appenzeller et al. |
| 2006/0099991 A1 | 5/2006 | Bajikar et al. |
| 2006/0161715 A1 | 7/2006 | Hamaguchi |

* cited by examiner

PRIOR ART    FIG. 4

SECURE FLASH-MEMORY CARD READER WITH HOST-ENCRYPTED DATA ON A FLASH-CONTROLLER-MASTERED BUS PARALLEL TO A LOCAL CPU BUS CARRYING ENCRYPTED HASHED PASSWORD AND USER ID

RELATED APPLICATION

This application is a continuation-in-part (CIP) of the co-pending application for "Electronic Data Storage Medium with Fingerprint Verification Capability", U.S. Ser. No. 09/478,720, filed Jan. 6, 2000. This application is also a CIP of "USB Card Reader", U.S. Ser. No. 10/956,826, filed Oct. 1, 2004, which is a CIP of "System and Method for Controlling Flash Memory", U.S. Ser. No. 10/789,333, filed Feb. 26, 2004, now abandoned.

FIELD OF THE INVENTION

This invention relates to secure flash-card readers, and more particularly to dual-bus flash-card readers with encryption and decryption engines.

BACKGROUND OF THE INVENTION

Flash memory has become widely used as a storage medium for a variety of applications. Flash memory uses electrically-erasable programmable read-only memory (EEPROM) as the non-volatile storage. For example, flash-memory cards can store digital pictures and video from a digital camera and transfer these pictures to a personal computer (PC). The flash-memory card is removed from the digital camera and inserted into a flash-memory reader attached to (or part of) the PC to transfer the pictures. Personal digital assistant (PDA's), music players, and other devices may also use flash-memory cards in a similar way.

A flash-card reader may be a stand-alone device that attaches to the PC using a Universal-Serial-Bus (USB), IEEE 1394, Integrated Device Electronics (IDE), serial AT-attachment (SATA), or other interface.

FIG. 1 shows a prior-art flash drive. Flash-memory controller 20 reads or writes flash memory 8 that is a permanent or removable part of flash drive controller device 61. CPU 10 executes routines stored in ROM 12 that include routines to send commands to flash-memory controller 20 to read and write the flash memory. CPU 10 also controls serial engine 22, which transfers data serially over USB link 18.

CPU 10 may use scratch-pad RAM 14 to store parameters, execution states, or small amounts of data being re-formatted during a transfer, but large amounts of the flash data being transferred is not normally stored in scratch-pad RAM 14. Data is normally transferred word-by-word directly from flash-memory controller 20 to CPU 10 and then to serial engine 22 without storage in scratch-pad RAM 14. New data words over-write any pervious data words, allowing scratch-pad RAM 14 to have a small capacity.

Data transfer rates are limited by bus 16. Bus 16 is a CPU-controlled bus. Master port 15 on CPU 10 acts as a bus master, controlling data transfer to and from one of slave ports 11, 17, 21, 23 on ROM 12, scratch-pad RAM 14, flash-memory controller 20, and serial engine 22, respectively.

FIG. 2 shows a prior-art flash-card reader. Flash-card controllers 24, 26 read or write flash memory on flash cards inserted into slots A, B of flash-card reader controller device 63. CPU 10 executes routines stored in ROM 12 that include routines to send commands to flash-card controllers 24, 26 to read and write the flash memory. CPU 10 also controls serial engine 22, which transfers data serially over USB link 18.

Data is normally transferred byte-by-byte directly from flash-card controllers 24, 26 to CPU 10 and then to serial engine 22 without storage in scratch-pad RAM 14. The width of bus 16 is often 8-bits (byte), but can be wider, and multiples of bus 16, such as 4, 8, or more burst transfers can occur.

Unfortunately, data-transfer rates may be limited by bus 16. Bus 16 is a CPU-controlled bus. Master port 15 on CPU 10 acts as a bus master, controlling data transfer to and from one of slave ports 11, 17, 23, 25, 27 on ROM 12, scratch-pad RAM 14, serial engine 22, and flash-card controllers 24, 26, respectively.

FIG. 3 shows a prior art PC with a USB interface. The flash drive/reader of FIGS. 1, 2 can be connected to USB link 128 of the PC in FIG. 3. CPU 104 executes programs for the user or operating system, using code in ROM 106 or in synchronous dynamic-random-access memory (SDRAM) 102. CPU 104 uses master port 105 to access SDRAM 102 through north bridge 108, which is an interface chip.

When transferring data such as a music file over USB link 128 to a flash card in an external reader, CPU 104 writes a data structure (from the music file, for example) in SDRAM 102. Then CPU 104 sends commands to USB host controller 122. CPU 104 uses its master port 105 to send the commands through north bridge 108 over Peripheral Component Interconnect (PCI) bus 120 to USB host controller 122. Master-slave port 123 on USB host controller 122 acts as a slave to receive these commands.

Once the commands are received by USB host controller 122, master-slave port 123 acts as a master of PCI bus 120. USB host controller 122 goes over PCI bus 120 and through north bridge 108 to read the data structure in SDRAM 102 that was earlier written by CPU 104. The data read from SDRAM 102 is then transmitted serially over USB link 128 by USB host controller 122. The serial engine on the external flash device can then accept the serial data and write the flash memory.

The inventors realize that buffering can improve data throughput. In particular, buffering of the data during the transfer between the flash-memory controller and the serial engine can improve throughput. The inventors also realize that a second data bus can further accelerate data transfers when the CPU does not use this second data bus. See for example Applicant's earlier patent, U.S. Pat. No. 6,874,044.

FIG. 4 shows a flash drive with a flash-serial buffer bus in parallel with the CPU bus with external and internal RAM buffers. CPU bus 38 inside flash drive controller chip 68 allows CPU 10 to access instructions in ROM 12, using master port 15 and slave port 11.

Master port 15 can also allow CPU 10 to write commands to flash-card controller 50 through its slave port 51, to flash-card controller 54 through its slave port 55, or to serial engine 32 through its slave port 35 connected to CPU bus 38. Flash-card controllers 50, 54 can access external RAM buffer 60 through their master ports 52, 56, over flash-serial buffer bus 40 and interface logic 64.

Likewise, serial engine 32 can use its master port 46 to access either slave port 42 of internal RAM buffer 34, or external RAM buffer 60 through interface logic 64. Other functional blocks may be integrated onto chip 68 besides flash-card controllers 50, 54 and may connect to CPU bus 38 or flash-serial buffer bus 40.

Once CPU 10 programs flash-card controllers 50, 54, or serial engine 32, data transfers can take place without using CPU bus 38. Data is sent over bus 40 to slave port 42 of RAM buffer 34. Once one or more blocks of flash data have been written into RAM buffer 34 by flash-card controller 50 or 54, serial engine 32 can read the flash data and serially transmit the flash data over USB link 18, uploading the data to a PC or other host device. Serial engine 32 uses its master port 46 to read the flash data in RAM buffer 34 using slave port 42.

While such flash readers are useful, the data stored on the flash-memory card may not be secure. The flash-memory card could be lost or stolen, especially for smaller-sized cards. The data on the card could be read by unauthorized persons, perhaps allowing that person to gain access to accounts or to sell valuable business or technical information. While data could be stored on the flash-memory card in an encrypted format using popular software programs, password-guessing programs could be used to guess the password and open the data for viewing.

What is desired is a secure flash-card reader that encrypts and decrypts data stored on flash-memory cards inserted into the secure flash-card reader. A secure flash-card reader is desired that operates with a secure host to ensure that unauthorized data access is blocked. A secure flash-card reader with a more advanced bus structures is desirable to increase the data transfer rates. Higher transfer rates within a secure flash-card reader are desirable. Tightly integrating hardware-based security features such as encryption engines within a secure flash-card reader with an advanced bus structure is desirable.

DETAILED DESCRIPTION

The present invention relates to an improvement in secure flash-card readers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that security hardware such as encryption and decryption engines may be integrated within a secure flash-card reader. Security hardware engines may be placed onto parallel buses within the secure flash-card reader. The secure flash-card reader may be tightly coupled with software running on the host to reduce the likelihood of hacking into the secured flash data.

Figure 1:
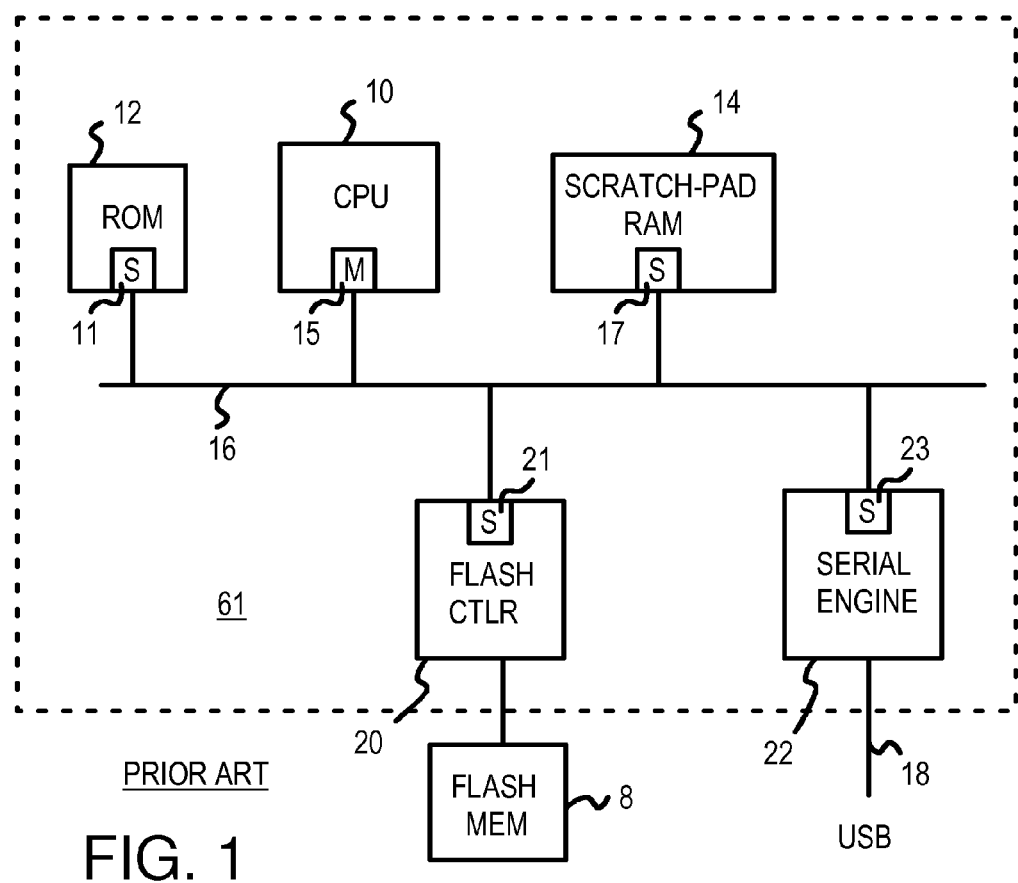
FIG. 1 shows a prior-art flash drive.
Figure 2:
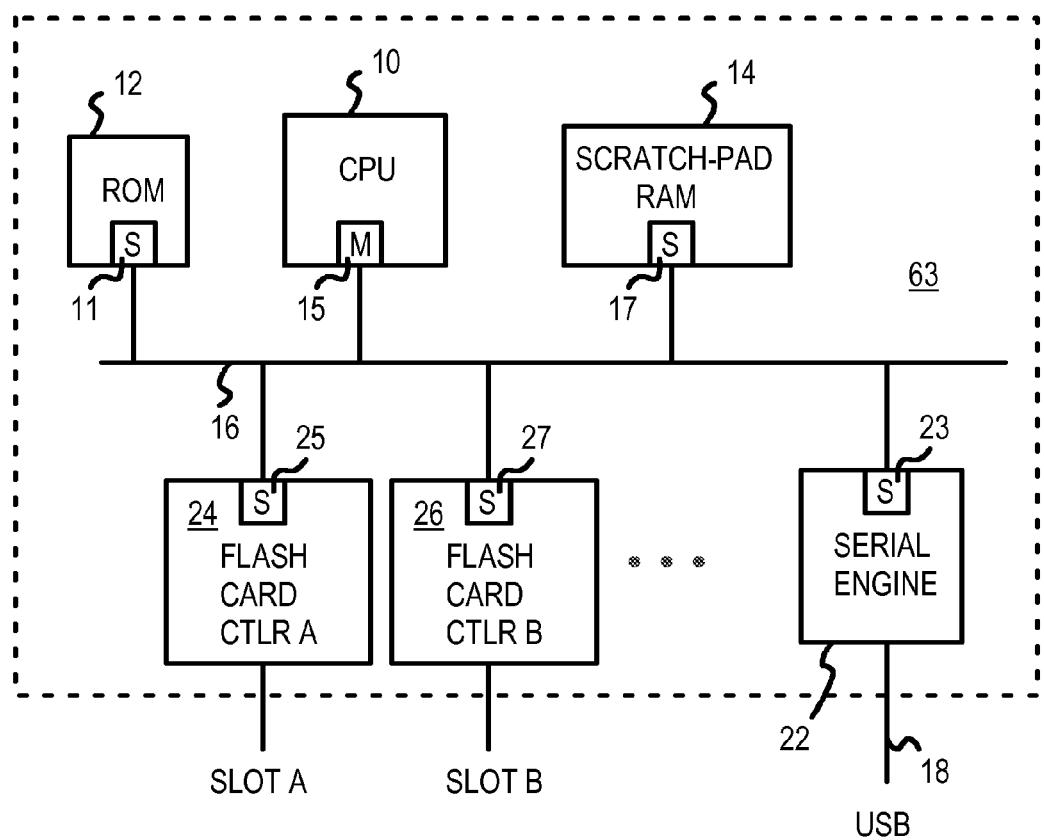
FIG. 2 shows a prior-art flash-card reader.
Figure 3:
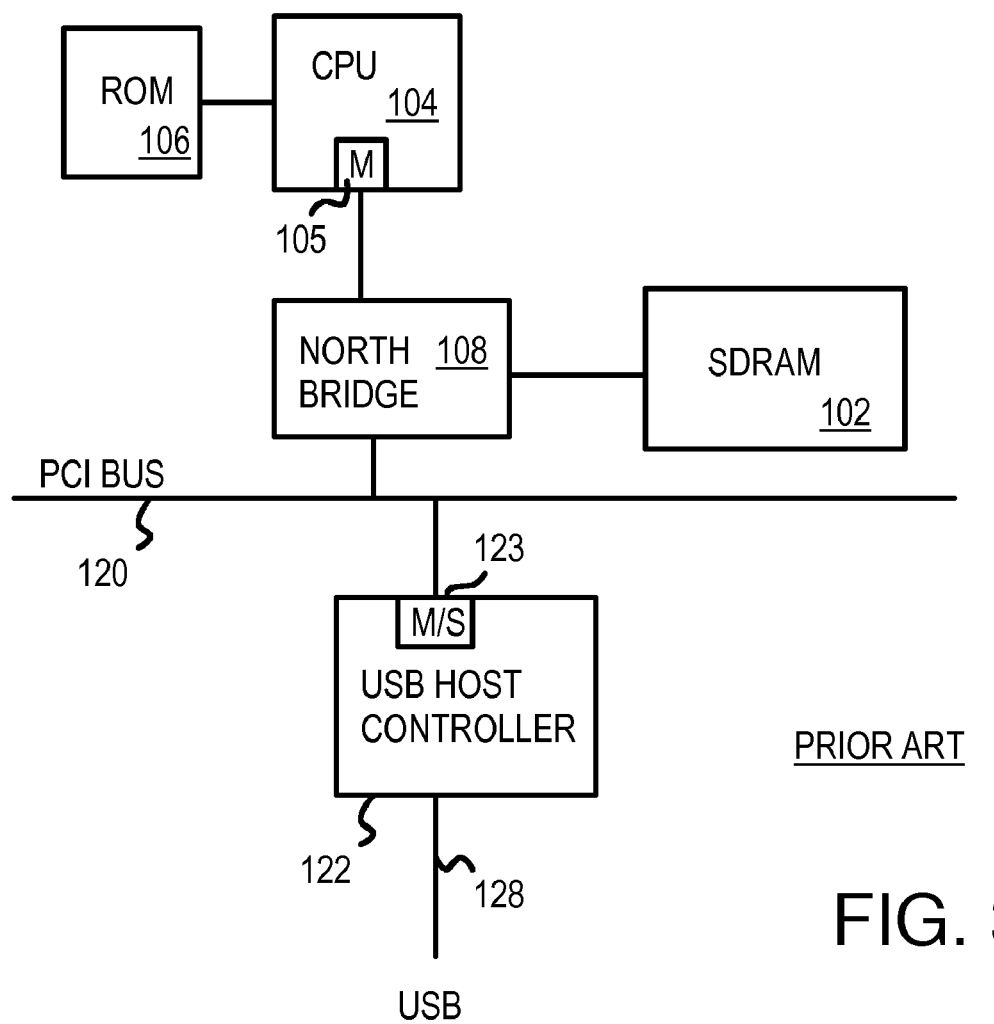
FIG. 3 shows a prior art PC with a USB interface.
Figure 4:
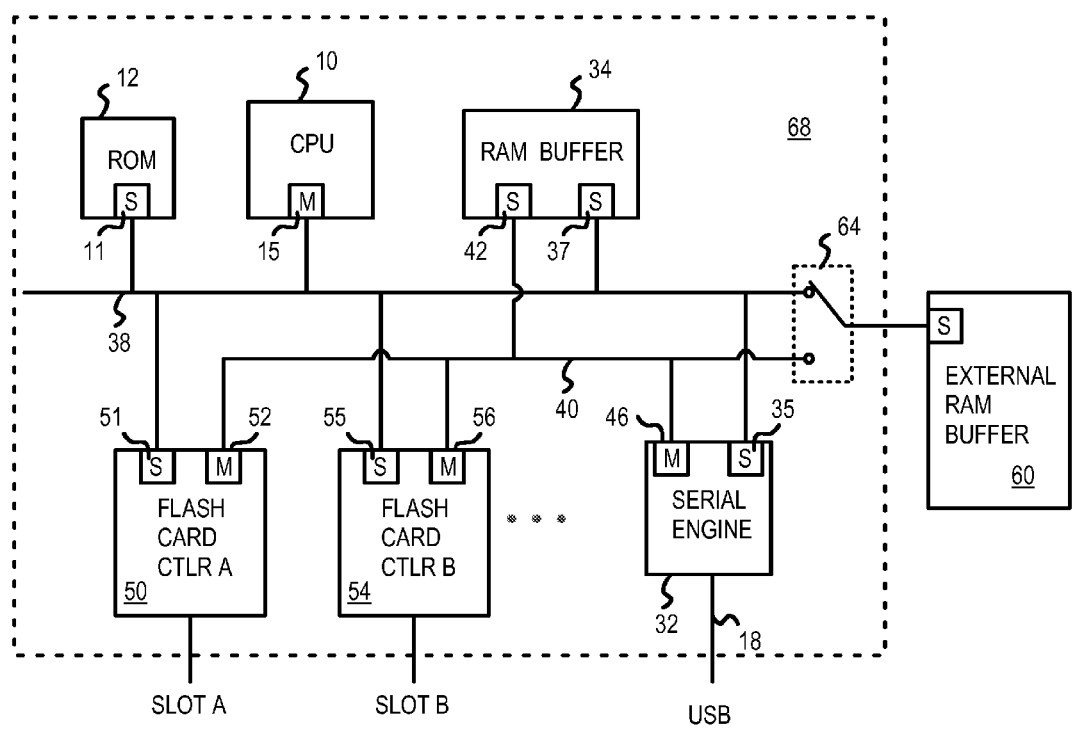
FIG. 4 shows a flash drive with a flash-serial buffer bus in parallel with the CPU bus with external and internal RAM buffers.
Figure 5:
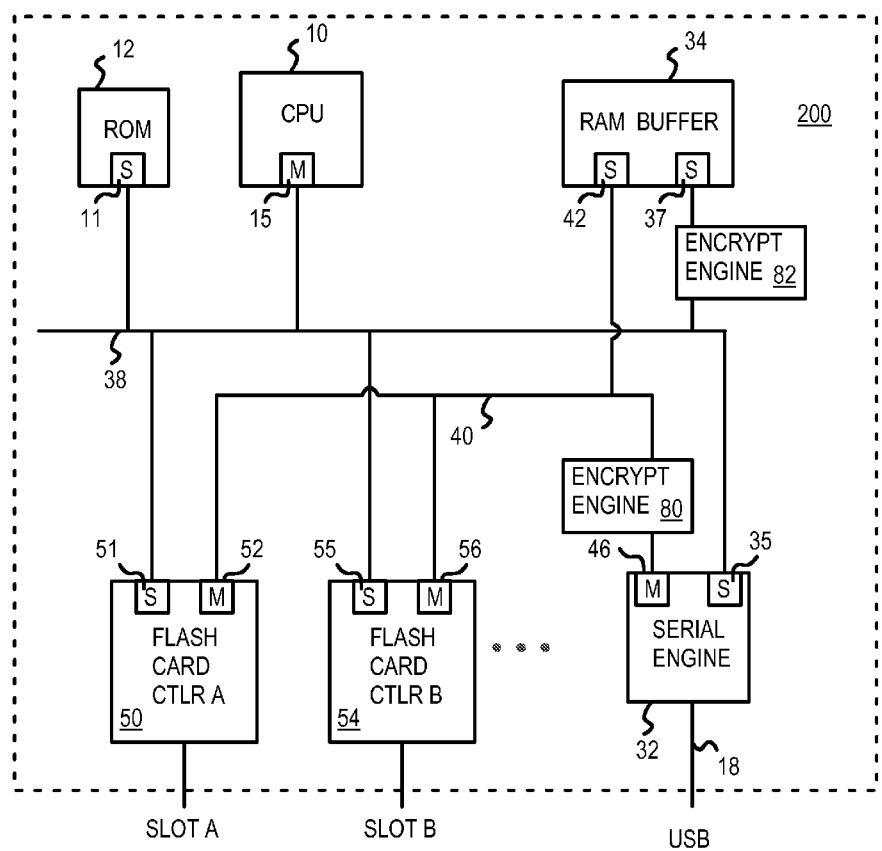
FIG. 5 is a block diagram of a secure flash-card reader with a flash-serial buffer bus in parallel with the CPU bus.

FIG. 5 is a block diagram of a secure flash-card reader with a flash-serial buffer bus in parallel with the CPU bus. One or more flash-card controllers 50, 54 connect to both CPU bus 38 and to flash-serial buffer bus 40. When a flash-memory card is inserted into slot A of secure flash-card reader 200, flash-card controller 50 can transfer data, while when a flash-memory card is inserted into slot B, flash-card controller 54 can transfer data. CPU 10 sends commands over CPU bus 38 to flash-card controllers 50, 54 using their slave ports 51, 55 and CPU master port 15.

Security is supported by inserting encryption engine 80 onto flash-serial buffer bus 40, between flash-card controllers 50, 54, RAM buffer 34 and serial engine 32. Clear, un-encrypted data from a non-secure host can be received over USB link 18 by serial engine 32. This clear data is sent over master port 46 of serial engine 32 to encryption engine 80, and the clear data is encrypted before being stored into RAM buffer 34. The encrypted data in RAM buffer 34 can then be read by flash-card controllers 50, 54 and stored onto flash cards.

Encrypted data on secure flash cards read by flash-card controllers 50, 54 is transferred over flash-serial buffer bus 40 to RAM buffer 34. The still-encrypted data in RAM buffer 34 is then read by serial engine 32 over flash-serial buffer bus 40, and is decrypted by encryption engine 80 between RAM buffer 34 and serial engine 32. The clear data can then be sent to the host over USB link 18 by serial engine 32.

Thus encryption engine 80 creates an encrypted-data domain between RAM buffer 34 and flash-card controllers 50, 54, while clear data is transferred between encryption engine 80 and serial engine 32 when the host is a non-secure host.

When secure flash-card reader 200 is connected to a secure host, the host transfers encrypted data over USB link 18. Then encryption engine 80 is disabled. Instead, the encrypted host data is passed through encryption engine 80 and stored into RAM buffer 34 for writing to flash by flash-card controllers 50, 54.

For secure hosts, passwords and keys are exchanged wit CPU 10 over CPU bus 38. Key encryption engine 82 is used by CPU 10 to encrypt and decrypt keys and other messages to and from the secure host. The secure host can send keys and encrypted messages over USB link 18 to serial engine 32, which stores these encrypted keys and messages using its master port 46 and flash-serial buffer bus 40 to slave port 42 of RAM buffer 34. Encryption engine 80 is disabled. Instead, when CPU 10 reads the encrypted key or messages from RAM buffer 34, key encryption engine 82 is activated as CPU 10 reads and validates these keys and messages from RAM buffer 34.

Figure 6:
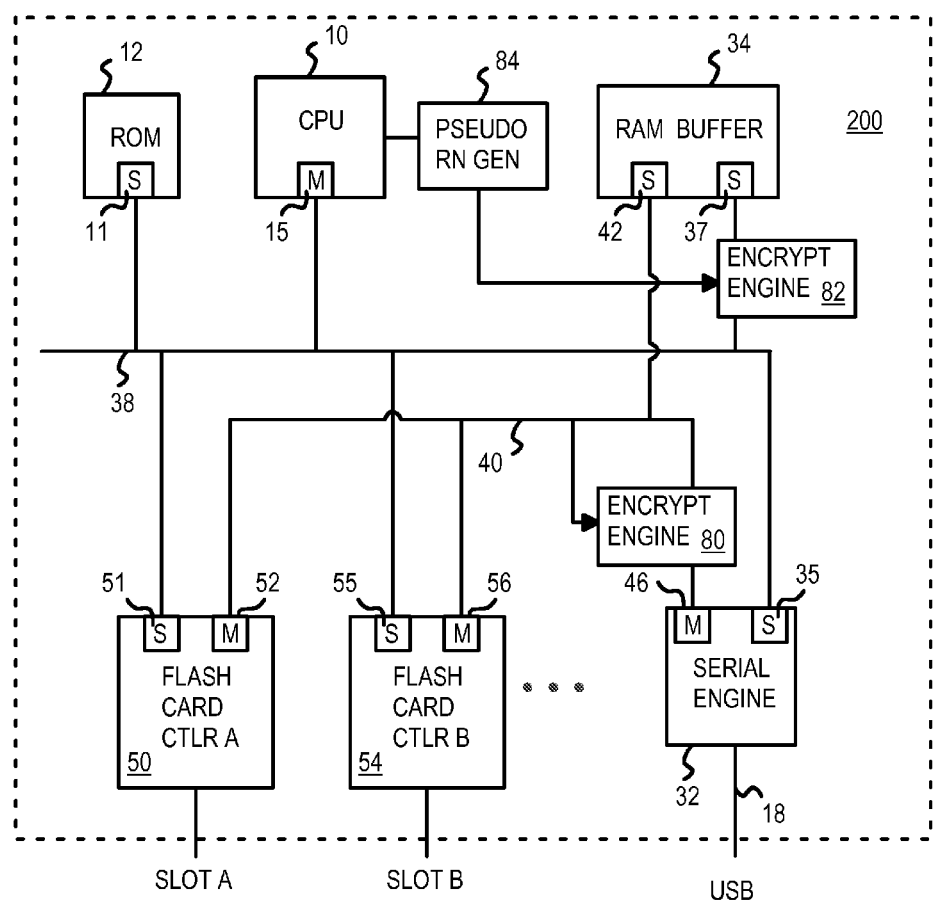
FIG. 6 shows a secure flash-card reader using a pseudo-random-number generator for key decryption.

FIG. 6 shows a secure flash-card reader using a pseudo-random-number generator for key decryption. CPU 10 activates pseudo-random-number generator 84 with a seed that determines the pseudo-random-number sequence of pseudo-random-numbers. This seed is obtained from a secure host. The pseudo-random-number from pseudo-random-number generator 84 is applied to key encryption engine 82 to decrypt the key from the secure host that was written into RAM buffer 34 by serial engine 32. The clear (decrypted) key generated by key encryption engine 82 can be stored in RAM buffer 34 or directly applied as the key to encryption engine 80. The clear key can be read from RAM buffer 34 and applied as the key to encryption engine 80 over one of the buses as well.

Figure 7:
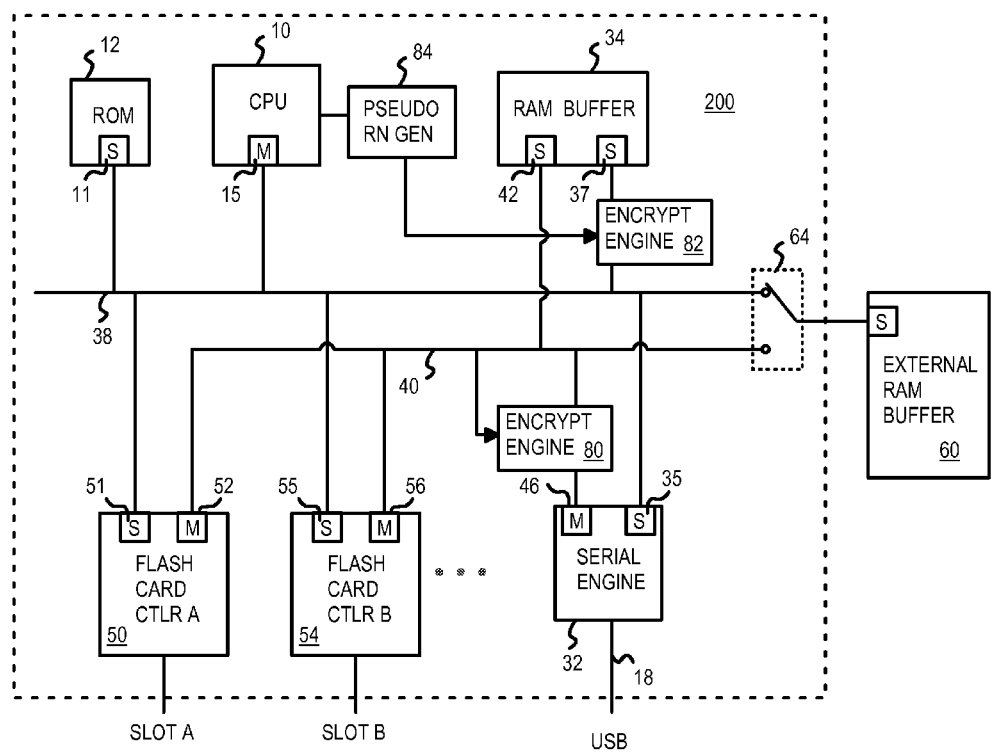
FIG. 7 shows a secure flash-card reader that uses an external RAM buffer.

FIG. 7 shows a secure flash-card reader that uses an external RAM buffer. Flash-card controllers 50, 54 can access external RAM buffer 60 through their master ports 52, 56, over flash-serial buffer bus 40 and interface logic 64. Likewise, serial engine 32 can use its master port 46 to access either slave port 42 of internal RAM buffer 34, or external RAM buffer 60 through interface logic 64.

External RAM buffer 60 stores encrypted data, since it sits on the encrypted-domain side of encryption engine 80 for flash-serial buffer bus 40. However, since external RAM buffer 60 connects to CPU bus 38 without passing through key encryption engine 82, external RAM buffer 60 is less useful for storing encrypted keys and messages than RAM buffer 34.

When data is to be transferred from the host PC or other device to the flash card in slot B, CPU 10 uses CPU bus 38 to command serial engine 32 to transfer the serial data from USB link 18 to RAM buffer 34. CPU 10 verifies and transfers the encryption key from RAM buffer 34 to encryption engine 80 when clear data from the host is to be encrypted for storage on the flash card.

Serial engine 32 uses its master port 46 to control bus 40, sending the data encrypted by the host or by encryption engine 80 to slave port 42 of RAM buffer 34. Once one or more data blocks of the serial data have been written into RAM buffer 34, CPU 10 again uses CPU bus 38 and slave port 55 to command flash-card controller 54 to read the pre-encrypted data from RAM buffer 34. Using it master port 56, flash-card controller 54 reads the data from RAM buffer 34 through slave port 42 and flash-serial buffer bus 40. Data could also be transferred in the opposite direction, or using the other flash-card controller 50.

Flash-serial buffer bus 40 is a multi-master bus in this embodiment. Serial engine 32 and flash-card controllers 50, 54 share control of bus 40. CPU 10 continues to control CPU bus 38. Bus 40 is partially in parallel to CPU bus 38, but does not connect to CPU 10 or to ROM 12 as does CPU bus 38. Bus 40 can have address and control signals as well as data signals, as can CPU bus 38. Bus 40 is a flash-serial buffer bus since it connects flash-card controllers 50, 54 to serial engine 32 through RAM buffer 34.

Since RAM buffer 34, flash-card controllers 50, 54, and serial engine 32 each have two ports, one for each of buses 38, 40, concurrent accesses can occur. For example, CPU 10 can send commands or read status registers in serial engine 32 using slave port 35 on CPU bus 38, while flash-card controller 50 writes flash data to RAM buffer 34 using flash-serial buffer bus 40. Data transfer is not halted or paused by CPU 10 accessing registers in serial engine 32. CPU 10 could even send commands or read status registers in flash-card controller 50 using slave port 51 on CPU bus 38 while flash-card controller 54 is transferring flash data to RAM buffer 34 using master port 56 and flash-serial buffer bus 40.

When both CPU 10 and flash-card controllers 50, 54 or serial engine 32 desire to access RAM buffer 34 at the same time, arbitration can be performed by RAM buffer 34 or other control logic. Slave ports 37, 42 can allow access by the two masters to occur one after another with minimal delay, since control of buses 38, 40 does not change. Arbitration is needed for memory access.

Figure 8:
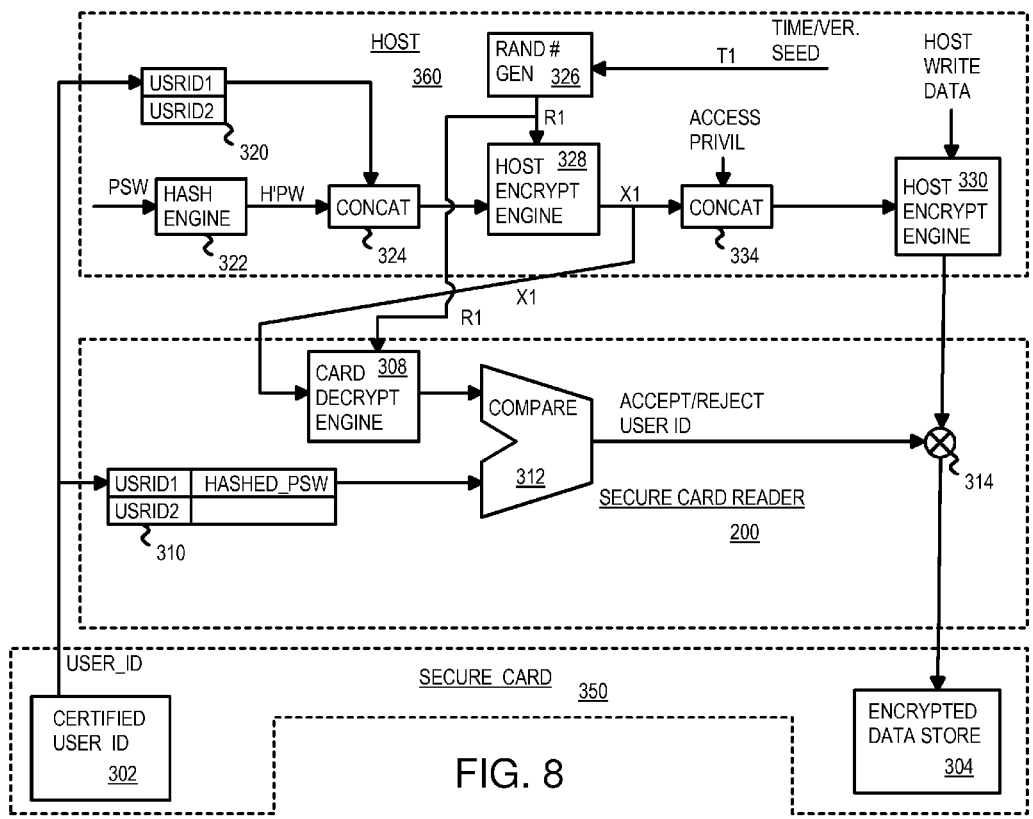
FIG. 8 shows a secure flash-card reader that is tightly coupled to a secure host by a host-generated random number and key.

FIG. 8 shows a secure flash-card reader that is tightly coupled to a secure host by a host-generated random number and key. Secure card 350 is inserted into secure flash-card reader 200, which is connected to secure host 360. While secure flash-card reader 200 can operate with a non-secure host, or a partially-secure host, security can be enhanced by using secure host 360.

Secure card 350 contains flash memory that stores certified user identifier 302 and encrypted data 304. Other data could be stored on secure card 350, including clear-text insecure data, or data for other users. The user ID is read from secure card 350 by secure flash-card reader 200, which reads certified user identifier 302 for the user ID.

The certified user ID read from secure card 350 is looked up in reader user table 310. When a match to the user ID is found in reader user table 310, a hashed password is read out from the matching entry. When no matching entry is found for the user ID, secure host 360 may be notified to either block access, or to certify this use by installing a matching entry in reader user table 310, perhaps by the host looking up this user ID in a larger table.

The certified user ID read from secure card 350 is also passed through secure flash-card reader 200 to secure host 360 and looked up in host user table 320. When no matching entry is found for the user ID, secure host 360 may block access, or activate a certification routine to certify this use by installing a matching entry in host user table 320, such as by the host looking up this user ID in a larger table, security server, or database.

Secure host 360 receives a password from the user, such as by displaying a message on a screen requesting that the user type in his password, and receiving the password on a keypad or keyboard. Biometric data could also be received, such as from a fingerprint reader or iris scanner. The password PSW is hashed by hashing engine 322 as H'PW and concatenated with the user ID from host user table 310, which may translate the user ID to a modified or internal ID that is not visible outside of secure host 360. Concatenator 324 outputs the combined hashed password and user ID to host-key encryption engine 328.

Random number generator 326 receives a time and version seed T1 from secure host 360 and generates a random number R1. Random number R1 is an encryption key that is used by host-key encryption engine 328 to encrypt the concatenated hashed password and user ID to generate encrypted key X1. Both random number R1 and encrypted key X1 are sent from secure host 360 to secure flash-card reader 200. Since the interface between secure host 360 and secure flash-card reader 200 may not be fully secure, providing two pieces of information (X1, R1) rather than just one key may increase security.

Card decryption engine 308 receives both encrypted key X1 and random number R1 from secure host 360, and performs decryption to extract the hashed password concatenated with the user ID. This is applied to one input of comparator 312, while the user ID and hashed password stored in the matching entry of reader user table 310 are applied to the other input to comparator 312. When these hashed passwords and user ID's match, comparator 312 signals that the user is accepted. When the hashed passwords or user ID's do not match, comparator 312 signals that the user ID is not accepted, and blocks access of encrypted data 304 on secure card 350.

Both host-key encryption engine 328 and card decryption engine 308 perform operations that are complements of each other, so that when the same key is applied to both, the same hashed password that was input to host-key encryption engine 328 is generated by card decryption engine 308.

Second concatenator 334 concatenates encrypted key X1 with access privileges to generate a second key that is applied to host-data encryption engine 330. Access privileges can include a number of times that access is allowed, such as a read limit or time limit for a library e-book, or attributes such as read-only.

Clear data from secure host 360 is applied to host-data encryption engine 330 and encrypted using the second key to create encrypted host-write data. The encrypted host-write data is sent from secure host 360 to secure flash-card reader 200, and is blocked from writing to secure card 350 by access controller 314 on secure flash-card reader 200 when comparator 312 signals a mismatch, or there is no matching entry in reader user table 310.

When comparator 312 signals a match, access controller 314 allows the encrypted host-write data from host-data encryption engine 330 to pass through and be written as encrypted data 304 in secure card 350.

Figure 9:
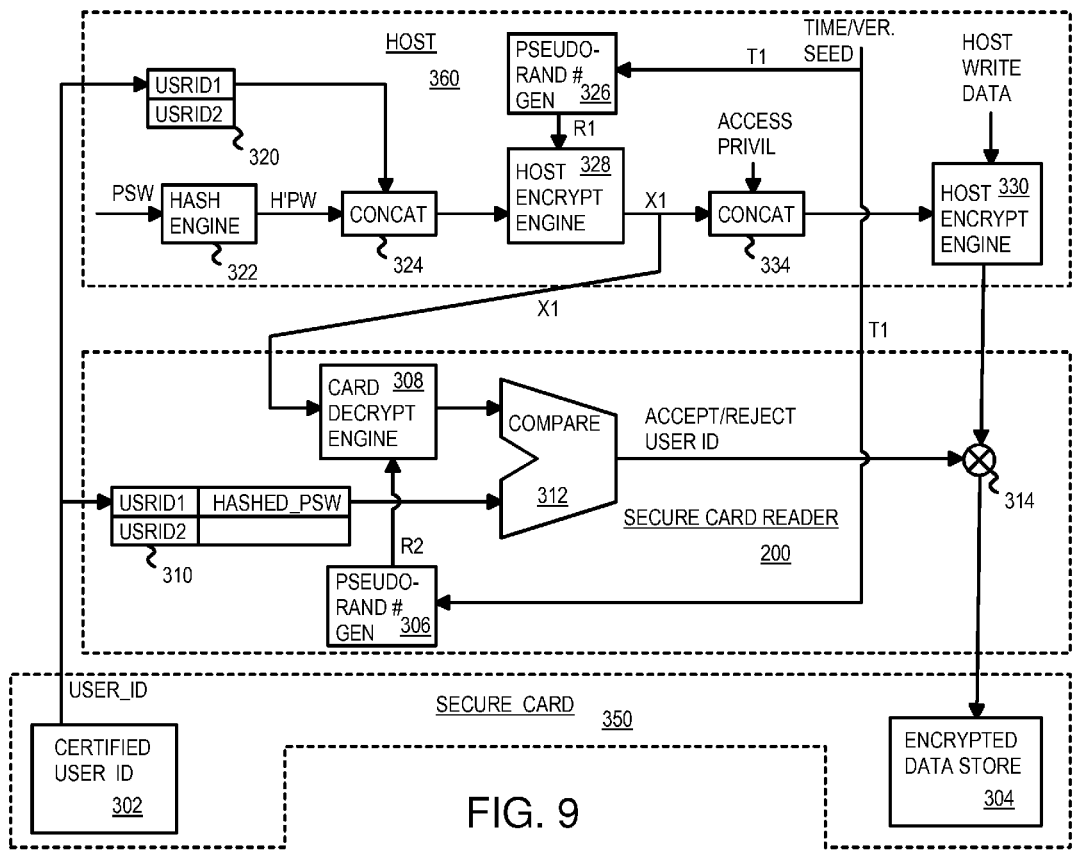
FIG. 9 shows a secure flash-card reader that is tightly coupled to a secure host by a host-generated seed for pseudo-random number generators.

FIG. 9 shows a secure flash-card reader that is tightly coupled to a secure host by a host-generated seed for pseudo-random number generators. In this alternate embodiment, pseudo-random numbers are separately generated on both secure host 360 and secure flash-card reader 200 by host pseudo-random number generator 326 and by card pseudo-random number generator 306. Pseudo-random numbers are a sequence of seeming random numbers that follow a pre-determined sequence of numbers. The same sequence can be re-generated when the same seed is applied. Thus the seed determines the sequence of pseudo-random-numbers.

A time and version seed T1 from secure host 360 is applied to host pseudo-random number generator 326. Host pseudo-random number generator 326 generates a pseudo-random number R1 used as an encryption key by host-key encryption engine 328 to encrypt the concatenated hashed password and user ID to generate encrypted key X1.

The time and version seed T1 from secure host 360 is also sent to secure flash-card reader 200. Card pseudo-random number generator 306 receives R1 and generates a local copy of pseudo-random number R1, pseudo-random number R2 that is used as a decryption key by card decryption engine 308. Card decryption engine 308 decrypts encrypted key X1 to recover the hashed password and user ID to apply to comparator 312 to validate the access.

Rather than send random number R1 from secure host 360 to secure flash-card reader 200, seed T1 is sent. The details of pseudo-random number generators 326, 306 are hidden from potential hackers.

Figure 10:
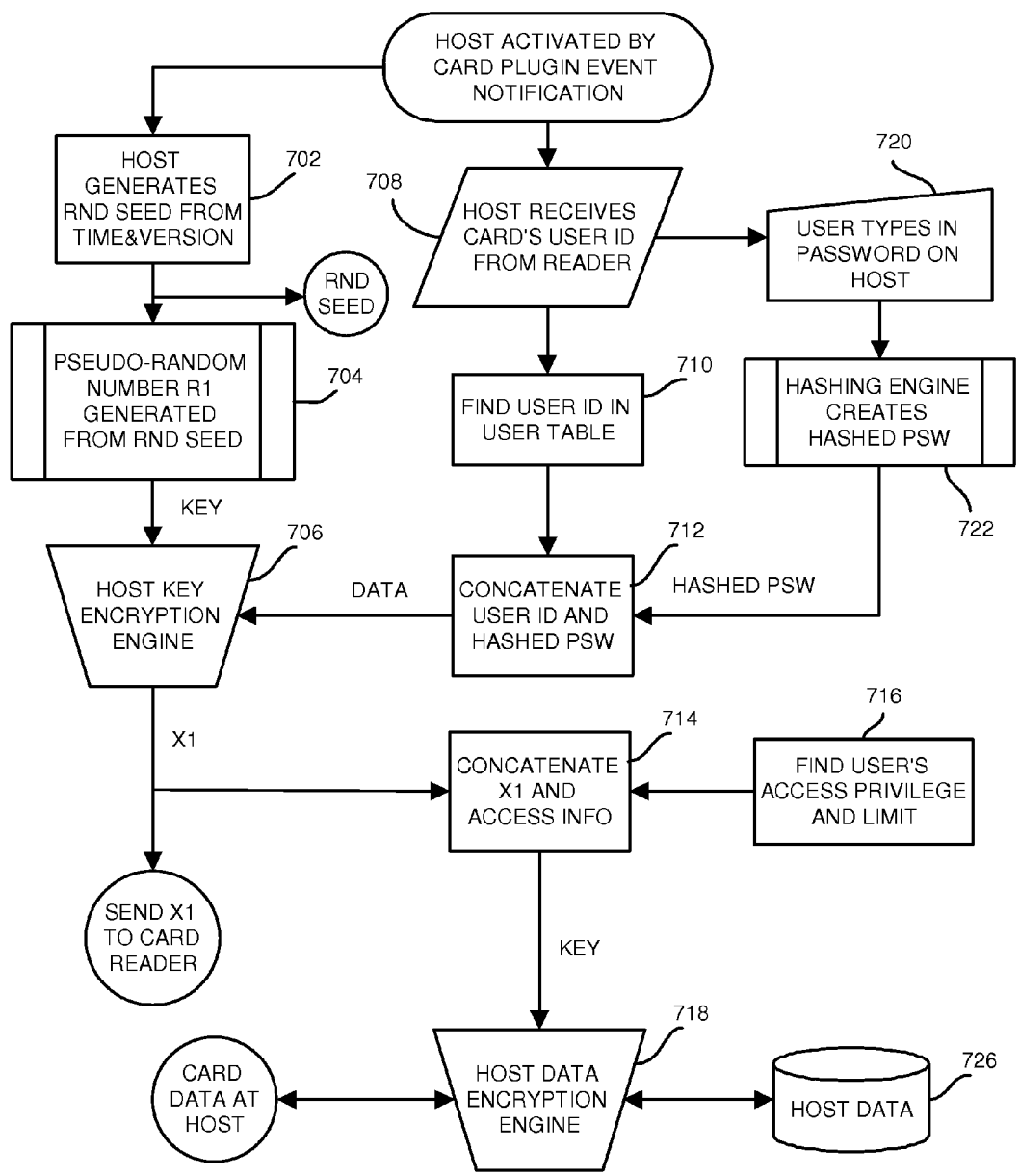
FIG. 10 is a flowchart of a secure host communicating with a secure flash-card reader to verify a secure data transfer.
Figure 11:
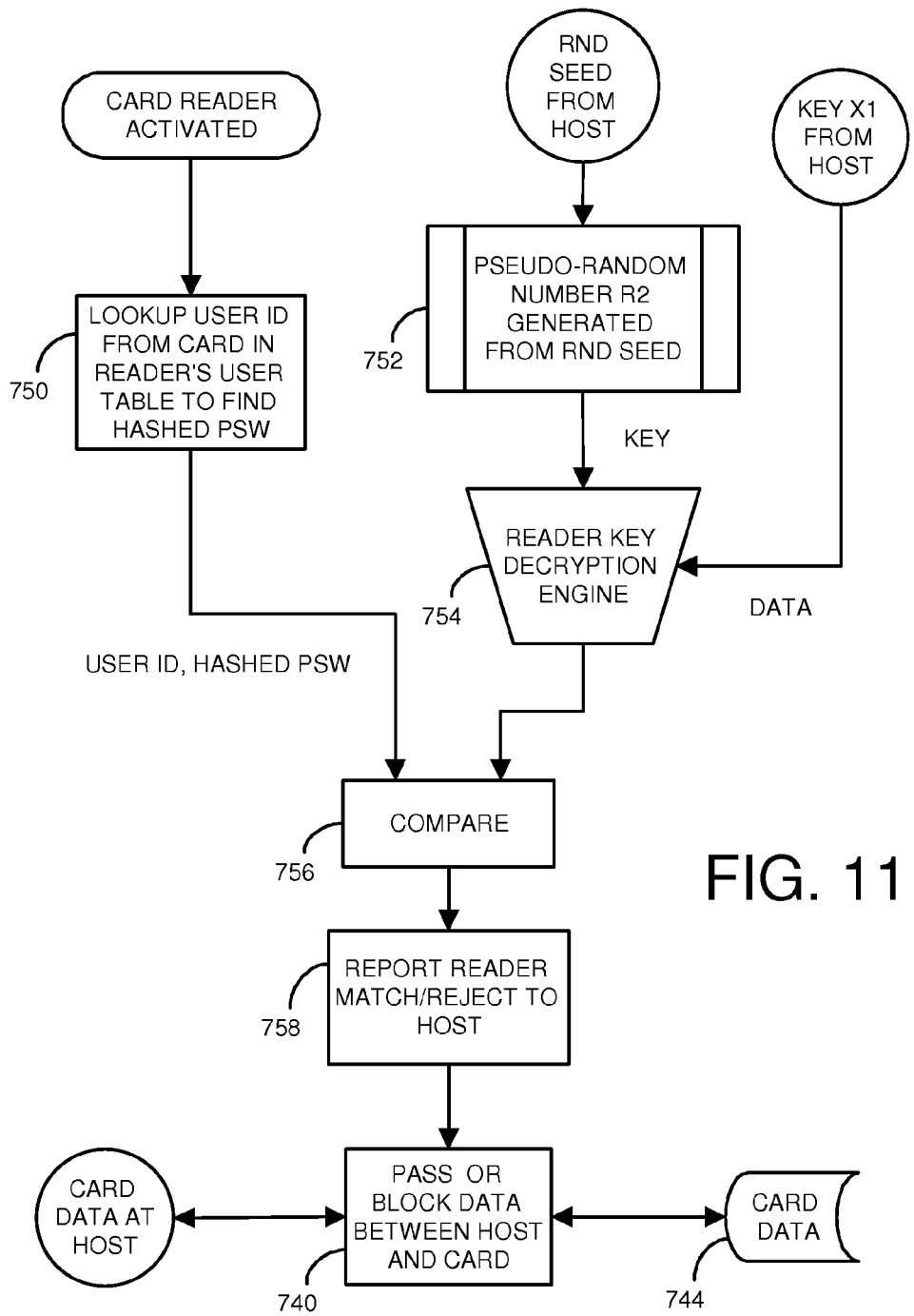
FIG. 11 is a flowchart of a secure flash-card reader verifying a secure data transfer using an encrypted key X1 and a random number R1 from a secure host.

Flowcharts—FIGS. 10, 11

FIG. 10 is a flowchart of a secure host communicating with a secure flash-card reader to verify a secure data transfer. When the secure card is inserted into a slot in the secure flash-card reader, a notification event is sent from the secure flash-card reader to the secure host.

The host receives the user's ID that is read from the certified user identifier in the secure card by the secure flash-card reader, step 708. A user table on the host is searched for this user ID, step 710. The user types in a password, step 720, and this password is hashed, step 722, to generate a hashed password. It is difficult or impossible for a hacker to generate the password from the hashed password, so security is enhanced.

The hashed password is concatenated with the user ID that was matched in the host's user table, step 712. The concatenated hashed password and user ID becomes the data applied to host-key encryption engine 706.

The host generates a random seed from the system time and a version of software on the host, step 702. This random seed is sent to the secure flash-card reader. Step 702 may be performed each time the secure flash card is plugged into the reader, or when the system is initialized, or each time a user accesses the card.

A pseudo-random-number R1 is generated from the random seed, step 704. This random number R1 is applied to host-key encryption engine 706 as the key. Host-key encryption engine 706 uses the key to encrypt the hashed password and user ID to generate encrypted key X1. Encrypted key X1 is sent from the secure host to the secure flash-card reader. Since the key is itself encrypted, it is more difficult for a hacker to use the key.

The user's access privileges are found, step 716, such as by reading an attributes field in the host's user table. An access limit that indicates the number of reads, writes, or overall accesses of the data may also be found. These access privileges are concatenated with encrypted key X1, step 714, to generate the second key. The second key is used by host-data encryption engine 718 to encrypt host data 726 that is being written to the secure card, or to decrypt encrypted data from the secure card for reading by the host as host data 726.

FIG. 11 is a flowchart of a secure flash-card reader verifying a secure data transfer using an encrypted key X1 and a random number R1 from a secure host. When the secure card is inserted into a slot in the secure flash-card reader, the secure flash-card reader obtains the user's ID that is read from the certified user identifier in the secure card. A user table on the secure flash-card reader is searched for this user ID, step 750. The matching entry contains a hashed password for this user, along with the matching user ID.

The random seed that was generated by the secure host is received by the secure flash-card reader and may be locally stored. A pseudo-random number generator on the secure flash-card reader uses this random seed to generate a random number R2, step 752. Since the same random seed was used in step 752 on the secure flash-card reader and in step 704 on the secure host, R1 and R2 have the same value. The encryption key on the host matches the decryption key on the secure flash-card reader.

The encrypted key X1 generate by host-key encryption engine 706 is sent from the secure host to the secure flash-card reader, and is applied to card decryption engine 754 as the data. The key input to card decryption engine 754 is random number R2 generated by the secure flash-card reader. Card decryption engine 754 re-generates the hashed password and user ID from encrypted key X1, which is compared in step 756 to the locally-stored hashed password and user ID from the matching entry. When the hashed passwords and user ID's match in step 756, the reader reports an accepted data transfer to the secure host, step 758, and data can flow between the secure host and encrypted data 744 on the secure card, step 740.

When the hashed passwords and user ID's mis-match in step 756, the reader reports a rejected data transfer to the secure host, step 758, and data flow is blocked between the secure host and encrypted data 744 on the secure card, step 740.

Figure 12:
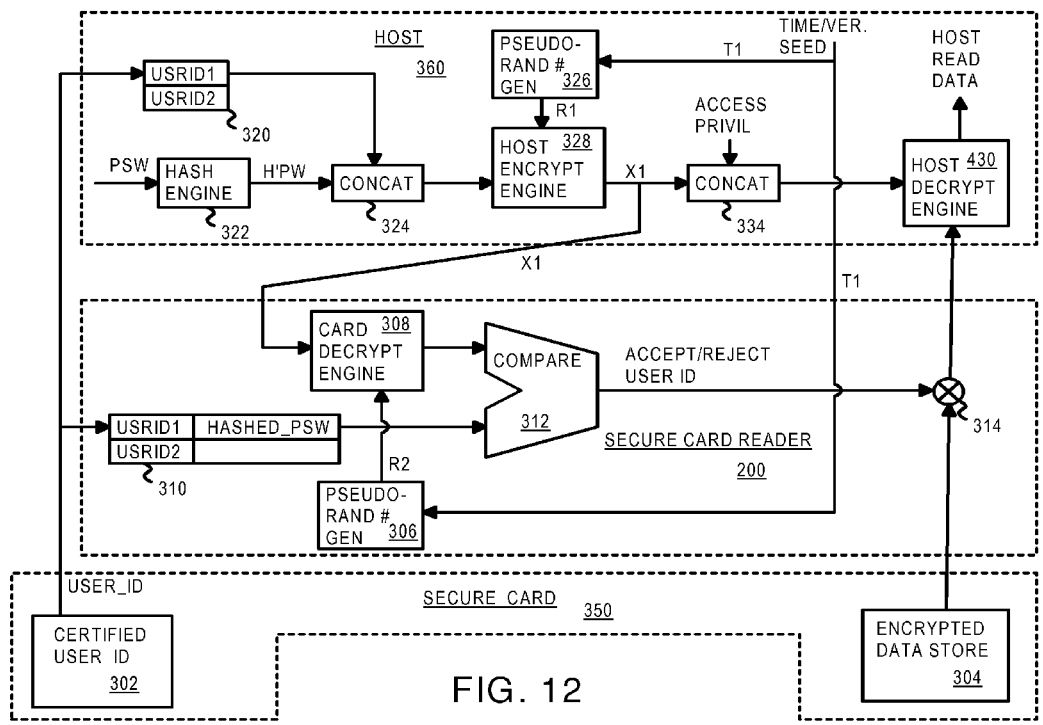
FIG. 12 shows a read operation by secure flash-card reader tightly coupled to a secure host.

FIG. 12 shows a read operation by secure flash-card reader tightly coupled to a secure host. Secure flash-card reader 200 and secure host 360 are tightly coupled together by a host-generated seed for pseudo-random number generators 326, 306, as described for FIG. 9.

Rather than writing host-write data to secure card 350, encrypted data 304 is read from secure card 350. When comparator 312 signals a match, access controller 314 allows encrypted data 304 from secure card 350 to pass through to host-data encryption engine 330. Host-data encryption engine 330 uses the second key generated from encrypted key X1 from host-key encryption engine 328 to decrypt encrypted data 304. Clear data can then be read by secure host 360 from host-data encryption engine 330.

Encrypted data 304 read by secure flash-card reader 200 is blocked by access controller 314 on secure flash-card reader 200 when comparator 312 signals a mismatch, or there is no matching entry in reader user table 310. Access controller 314 then prevents encrypted data 304 from being sent to secure host 360 and decrypted by host-data encryption engine 330.

Figure 13:
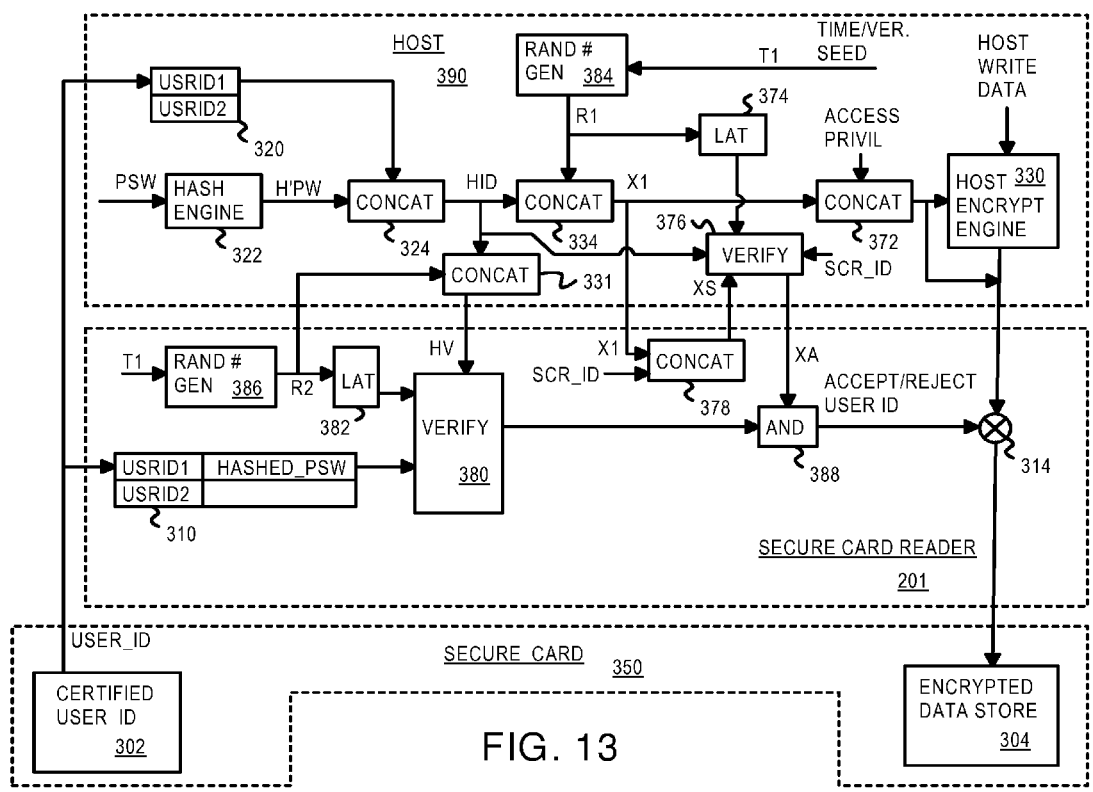
FIG. 13 shows a more complex alternate embodiment with more device verification exchanges between the secure flash-card reader and the secure host.

FIG. 13 shows a more complex alternate embodiment with more device verification exchanges between the secure flash-card reader and the secure host.

Secure card 350 is inserted into secure flash-card reader 201, which is connected to secure host 390. While secure flash-card reader 201 can operate with a non-secure host, or a partially-secure host, security can be enhanced by using secure host 390. While two items, encrypted key X1 and random number R1, are exchanged in the embodiment of FIG. 8, five items are exchanged in this alternate embodiment to increase security and make hacking more difficult.

Secure card 350 contains flash memory that stores certified user identifier 302 and encrypted data 304. The user ID is read as certified user identifier 302 from secure card 350 by secure flash-card reader 201. The certified user ID read from secure card 350 is looked up in reader user table 310. When a match to the user ID is found in reader user table 310, a hashed password is read out from the matching entry. When no matching entry is found for the user ID, secure host 390 may be notified to either block access, or to certify this use by installing a matching entry in reader user table 310, perhaps by the host looking up this user ID in a larger table.

The certified user ID read from secure card 350 is also passed through secure flash-card reader 201 to secure host 390 and looked up in host user table 320. When no matching entry is found for the user ID, secure host 390 may block access, or activate a certification routine to certify this use by installing a matching entry in host user table 320, such as by the host looking up this user ID in a larger table, security server, or database.

Secure host 390 receives a password from the user, such as by displaying a message on a screen requesting that the user type in his password, and receiving the password on a keypad or keyboard. The password PSW is hashed by hashing engine 322 as H'PW and concatenated with the user ID from host user table 310, which may translate the user ID to a modified or internal ID that is not visible outside of secure host 390. Concatenator 324 outputs the combined hashed password and user ID (HID) to concatenators 334, 331.

Random number generator 384 receives a time and version seed T1 from secure host 390 and generates a random number R1 which is latched by latch 374. Random number R1 is concatenated with HID by concatenator 334 to generate encrypted key X1.

Concatenator 372 concatenates encrypted key X1 with access privileges to generate a second key that is applied to host-data encryption engine 330. Access privileges can include a number of times that access is allowed, such as a read or time limit for a library e-book, or attributes such as read-only.

Random number generator 386 on secure flash-card reader 201 also receives the time and version seed T1 from secure host 390 and generates a random number R2 which is latched by latch 382. Random number R2 matches random number R1 from random number generator 384 on secure host 390 since the same random seed T1 is applied to both generators. Random number R2 is sent from secure flash-card reader 201 to secure host 390 and concatenated with the hashed password and user ID HID by concatenator 331 to generate a verification key HV that is sent back to secure flash-card reader 201 and applied to verifier 380.

Verification key HV and latched random number R2 are applied to one input of verifier 380, while the user ID and hashed password stored in the matching entry of reader user table 310 are applied to the other input to verifier 380. When these hashed passwords and user ID's match, verifier 380 signals that the user is accepted. When the hashed passwords or user ID's do not match, verifier 380 signals that the user ID is not accepted, and blocks access of encrypted data 304 on secure card 350.

Secure host 390 also performs verification using verifier 376, which compares the hashed password and user ID HID from concatenator 324 and random number R1 from latch 374 and a device ID for secure flash-card reader 201 (SCR_ID) to encrypted key X1 from concatenator 334, which is sent to concatenator 378 on secure flash-card reader 201 and concatenated with the reader's device ID SCR_ID to generate signal XS. Signal XS is sent back to secure host 390. When the values match, verifier 376 sends an accept message XA to AND gate 388 on secure flash-card reader 201, which generates the final accept or reject signal to access controller 314 by combining the signal from verifier 380.

Clear data from secure host 390 is applied to host-data encryption engine 330 and encrypted using the second key to create encrypted host-write data. The encrypted host-write data is sent from secure host 390 to secure flash-card reader 201, and is blocked from writing to secure card 350 by access controller 314 on secure flash-card reader 201 when either verifier 380 or verifier 376 signals a mismatch.

When both verifier 380 and verifier 376 signal a match, access controller 314 allows the encrypted host-write data from host-data encryption engine 330 to pass through and be written as encrypted data 304 in secure card 350.

Since the interface between secure host 390 and secure flash-card reader 201 may not be fully secure, providing five pieces of information (R2, HV, X1, XS, XA) rather than just one key may increase security.

Alternate Embodiments

Several other embodiments are contemplated by the inventors. For example. Other functional blocks may be integrated onto secure flash-card reader 200 besides flash-card controllers 50, 54 and may connect to CPU bus 38 or flash-serial buffer bus 40. Other flash-card controllers may also be present and connect to flash-serial buffer bus 40 in a similar way. Rather than combining by concatenating, other combinations could be used, such as XOR'ing, adding, rotating, shifting, etc.

The user ID that is output from the user tables does not have to be the same user ID that is searched for in the table. The input user ID could map to a different value, such as a hashed user ID that is output. This may improve security. Additional routines and procedures may be added. For example, when the secure flash-card reader is connected to the secure host, verification procedures on both can exchange messages to verify that the other device is secure. The reader user table can be constructed or populated during this initialization handshaking.

While a combined encryption and decryption engine has been shown, separate engines that perform only one function could be substituted. Some blocks could use programmable logic or programmed processors, and could be pipelined, time-shared, or sequenced in a variety of ways.

While the term "reader" has been used, both reading and writing of the flash memory cards can usually be performed by the "readers" or flash drives. Data may be buffered again by a flash-memory controller, pipelines in the CPU, or at other locations besides the RAM buffer. The flash memory cards and chips themselves may internally buffer data being written in or read out.

Various alternative mastering schemes could be used. Direct transfers bypassing RAM buffer 34 could be performed between the serial engine and the flash-memory controller or flash-card controllers when only the serial engine is the bus master and a large buffer exists in serial engine or in one of the flash controllers. RAM buffer 34 could have one internal port and two external slave ports, or could have external logic to combine the two slave ports to access one port on RAM chips. A full dual-port RAM could also be used.

Buses can have address and control signals as well as data signals. Data and address could be time-multiplexed to use the same physical metal traces, or could have dedicated wiring lines. Master and slave ports can be interfaces that include data, address, and control signals. Often the master generates the address and many control signals, but the slave generates reply control signals such as READY. The slave supplies data on reads but accepts data on writes. Timing is mainly controlled by the master, but the slave can sometimes adjust timing, such as by delaying a READY or other handshake signal, or by terminating an access early.

Rather than just two buses, three or more buses may be used in parallel. For example, two flash-serial buffer buses could be used, allowing both the serial engine and the flash-memory controller or flash-card controller to transfer data concurrently. Buses that connect to only a subset of the controllers or to the serial engine could be used when many buses are used. One bus could be dedicated to transfers between the serial engine and the RAM buffer 34, while another bus is for transfers between the RAM buffer and the flash-memory controller. Additional RAM buffers could be added, or the RAM buffer could be partitioned to allow simultaneous access without arbitration delays of different memory partitions. Rather than use FIFO buffers, the flash data can be stored out of sequence. A catalog or index can be used to locate the desired pages, or other address re-mapping or translation logic may be used.

The CPU can perform high-level security and other protocols and more complex operations for serial engine 32, flash-memory controller, or flash-card controllers 50, 54. This can allows for a reduced complexity for the controllers since complex functions can be programmably executed by CPU 10. The serial engine can use a USB link, or can use other links, such as IEEE 1394, ATA, SATA, IDE, PCI Express, mini-PCI Express, infrared, Bluetooth, RF, etc.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A secure flash-memory peripheral comprising:
   a local central processing unit (CPU) for executing instructions for operating the secure flash-memory peripheral;
   a CPU bus primarily controlled by the local CPU;
   a flash-serial buffer bus not primarily controlled by the local CPU;
   a RAM buffer for storing encrypted flash data for storage by the secure flash-memory peripheral;
   a flash-memory-card controller for controlling a removable flash card with a flash memory that stores the encrypted flash data, having a slave port for coupling to the CPU bus and receiving commands from the local CPU, and having a master port for coupling to the flash-serial buffer bus for transferring encrypted flash data to the RAM buffer;
   a serial link for connecting the secure flash-memory peripheral to a personal computer;
   a serial engine for sending and receiving the clear flash data serially over the serial link, the serial engine having a slave port for coupling to the CPU bus and receiving commands from the local CPU, and having a master port for coupling to the flash-serial buffer bus for transferring clear flash data to the RAM buffer; and
   an encryption engine on the flash-serial buffer bus, for encrypting clear flash data from the serial engine for storage as encrypted flash data by the flash-memory-card controller, and for decrypting encrypted flash data read by the flash-memory-card controller to generate clear flash data for transfer by the serial engine,
   whereby the flash-serial buffer bus transfers the encrypted flash data and the CPU bus sends commands to the flash-memory-card controller and to the serial engine.

2. The secure flash-memory peripheral of claim 1 wherein the encrypted flash data is read from the flash memory by the flash-memory-card controller and sent over the flash-serial buffer bus to the RAM buffer;
   wherein the encrypted flash data is read from the RAM buffer through the flash-serial buffer bus to the encryption engine to generate the clear flash data sent to the serial engine to be sent serially over the serial link,
   wherein incoming flash data from the serial engine is converted to encrypted flash data by the encryption engine and written to the RAM buffer through the flash-serial buffer bus,
   wherein the encrypted flash data is read from the RAM buffer through the flash-serial buffer bus to the flash-memory-card controller and written to the flash memory,
   whereby the RAM buffer stores the encrypted flash data.

3. The secure flash-memory peripheral of claim 1 further comprising:
   a first slave port on the RAM buffer, for connecting the CPU bus to the RAM buffer;
   a second slave port on the RAM buffer, for connecting the flash-serial buffer bus to the RAM buffer, whereby the RAM buffer has two slave ports to connect to two buses.

4. The secure flash-memory peripheral of claim 1 further comprising:

a second encryption engine between the CPU bus and the first slave port to the RAM buffer, for decrypting keys received by the serial engine and stored in the RAM buffer that are read by the local CPU, whereby encrypted keys received by the serial engine are decrypted for the local CPU.

5. The secure flash-memory peripheral of claim 4 further comprising:

a random-number generator, activated by the local CPU and coupled to the encryption engine and to the second encryption engine, for generating a random number or a pseudo-random number.

6. The secure flash-memory peripheral of claim 4 further comprising:

a reader user table for storing user identifiers and hashed passwords, for verifying access to the encrypted flash data by comparing a user identifier and a hashed password to a key received by the serial engine, whereby hashed passwords are stored in the reader user table for verification.

7. The secure flash-memory peripheral of claim 2 further comprising:

a plurality of slots each for accepting a flash-memory card for storing the encrypted flash data;

a plurality of flash-card controllers, coupled to the plurality of slots to read flash-memory cards inserted into the plurality of slots, each flash-card controller having a slave port coupled to the CPU bus to receive commands from the local CPU, and each having a master port coupled to the flash-serial buffer bus, for transferring encrypted flash data to the RAM buffer, wherein the secure flash-memory peripheral is a multi-slot flash-card reader.

8. The secure flash-memory peripheral of claim 2 wherein the serial link is a Universal-Serial-Bus (USB).

9. The secure flash-memory peripheral of claim 2 wherein the serial link is a IEEE 1394 bus, an Integrated-Device-Electronics (IDE) bus, a serial AT-attachment (SATA) bus, a PCI Express bus, or a mini-PCI Express bus.

10. A secure flash reader comprising:

a reader user table that stores a hashed password associated with a user identifier for a user, the user entering a password that is hashed by a host to generate the hashed password;

an encrypted key input that receives an encrypted key from the host, the encrypted key being generated by the host from the hashed password and the user identifier;

a card decryption engine that receives the encrypted key from the encrypted key input, and receives a random number, the card decryption engine generating a decrypted key from the encrypted key by using the random number as a key to decrypt the encrypted key;

a comparator that compares the decrypted key from the card decryption engine to the hashed password and the user identifier from the reader user table and generates a disable signal when a mis-match is detected;

an access controller activated by the disable signal from the comparator to block access of encrypted flash data by the host;

a flash-card controller that reads the encrypted flash data from a flash-memory card inserted into the secure flash reader; and a host interface to the host for receiving the encrypted key from the host and for sending the encrypted flash data to the host when the comparator does not generate the disable signal, whereby the encrypted flash data is read when the hashed password is verified.

11. The secure flash reader of claim 10 further comprising:

a pseudo-random-number generator that generates the random number to the card decryption engine from a host seed received from the host.

12. The secure flash reader of claim 10 wherein the random number is received by the host interface from the host.

13. The secure flash reader of claim 10 further comprising:

a local processor that executes instructions for controlling operation of the secure flash reader;

a processor bus, mastered by the local processor, for sending commands from the local processor;

a buffer bus, not connected to the local processor, for transferring encrypted flash data; and a RAM buffer for storing encrypted flash data;

wherein the flash-card controller reads encrypted flash data from a flash memory in response to commands from the local processor;

wherein the host interface is a serial engine for sending the encrypted flash data as serial data over a serial interface.

14. The secure flash reader of claim 13 further comprising:

a flash slave port, on the flash-card controller, for connecting the flash-card controller to the processor bus as a bus-slave device;

a flash master port, on the flash-card controller, for connecting the flash-card controller to the buffer bus when the flash-card controller acts as a bus-master device;

an engine slave port, on the serial engine, for connecting the serial engine to the processor bus as a bus-slave device;

an engine master port, on the serial engine, for connecting the serial engine to the buffer bus when the serial engine acts as the bus-master device;

a first slave port, on the RAM buffer, for connecting the RAM buffer to the processor bus as a bus-slave device; and a second slave port, on the RAM buffer, for connecting the RAM buffer to the buffer bus as a bus-slave device when the flash-card controller or the serial engine acts as the bus-master device, whereby the processor bus transfers commands while the buffer bus transfers the encrypted flash data bypassing the local processor.

15. The secure flash reader of claim 14 wherein the processor bus acts independently of the buffer bus, the local processor able to send commands over the processor bus independent of and at a same time as encrypted flash data is transferred over the buffer bus.

16. The secure flash reader of claim 13 wherein the flash-card controller is a first flash-card controller connected to a first slot for receiving a first flash-memory card that stores encrypted flash data;

further comprising:

a second flash-card controller connected to a second slot for receiving a second flash-memory card that stores encrypted flash data;

a second flash slave port, on the second flash-card controller, for connecting the second flash-card controller to the processor bus as a bus-slave device;

a second flash master port, on the second flash-card controller, for connecting the second flash-card controller to the buffer bus when the second flash-card controller acts as a bus master device, whereby multiple flash-cards can be read by flash reader.

17. The secure flash reader of claim 13 further comprising:

interface logic, coupled to the processor bus and coupled to the buffer bus, for connecting the processor bus or the buffer bus to an external RAM buffer for storing an overflow of encrypted flash data, whereby overflow encrypted flash data is stored in the external RAM buffer.

18. A secure flash device comprising:

flash-memory controller means for reading and writing encrypted flash data stored in a flash memory card;

buffer bus means for transferring encrypted flash data from the flash-memory controller means;

data buffer means, coupled to the buffer bus means as a bus slave, for storing the encrypted flash data being read from or written to the flash memory card;

serial engine means, coupled to the buffer bus means as a bus master, for reading encrypted flash data stored by the data buffer means and for serially transmitting the encrypted flash data over a serial link to a secure host;

key-decryption means for decrypting an encrypted key received from the secure host by the serial engine means to generate a recovered hashed password;

table means for storing a stored hashed password associated with a user identifier;

compare means for comparing the stored hashed password from the table means to the recovered hashed password from the key-decryption means to generate an access-disable signal; and access-disable means for blocking access by the secure host to the encrypted flash data when the access-disable signal is generated by the compare means, whereby the access-disable means prevents transfer of the encrypted flash data over the serial engine means to the secure host when the access-disable signal is generated.

19. The secure flash device of claim 18 further comprising the secure host which comprises:

host reader user table means for storing user identifiers for certified users;

hashing means for receiving and hashing a password from a user to generate a hashed password; and host-key encryption means, receiving the hashed password and a random number, for generating the encrypted key sent from the secure host to the key-decryption means by the serial engine means.

20. The secure flash device of claim 18 further comprising:

processor means for executing controlling instructions;

processor bus means for transferring commands from the processor means;

wherein the encrypted flash data is transferred from the flash-memory controller means to the data buffer means over the buffer bus means bypassing the processor means;

wherein the encrypted flash data is transferred from the data buffer means to the serial engine means over the buffer bus means bypassing the processor means, whereby transfers of the encrypted flash data use the buffer bus means to bypass the processor means.

* * * * *